United States Patent
McKeon et al.

(10) Patent No.: US 12,031,407 B2
(45) Date of Patent: Jul. 9, 2024

(54) ANNULUS PRESSURE RELEASE SYSTEM

(71) Applicant: Cameron International Corporation, Houston, TX (US)

(72) Inventors: Michael Anthony McKeon, Longford (IE); Edmund Peter McHugh, Longford (IE)

(73) Assignee: Cameron International Corporation

( * ) Notice: Subject to any disclaimer, the term of this patent is extended or adjusted under 35 U.S.C. 154(b) by 80 days.

(21) Appl. No.: 17/998,201

(22) PCT Filed: May 14, 2021

(86) PCT No.: PCT/US2021/032402
§ 371 (c)(1),
(2) Date: Nov. 8, 2022

(87) PCT Pub. No.: WO2021/231833
PCT Pub. Date: Nov. 18, 2021

(65) Prior Publication Data
US 2023/0213951 A1      Jul. 6, 2023

Related U.S. Application Data

(60) Provisional application No. 63/024,573, filed on May 14, 2020, provisional application No. 63/026,924, filed on May 19, 2020.

(51) Int. Cl.
*E21B 47/06*      (2012.01)
*E21B 34/00*      (2006.01)
(Continued)

(52) U.S. Cl.
CPC .............. *E21B 34/02* (2013.01); *E21B 34/00* (2013.01); *E21B 47/06* (2013.01); *G01F 15/185* (2013.01)

(58) Field of Classification Search
CPC ........ F16K 31/04; F16K 3/0281; F16K 3/029; F16K 27/003; F16K 31/508; F16K 31/53; F16K 37/0041
See application file for complete search history.

(56) References Cited

U.S. PATENT DOCUMENTS 3,410,137 A  *  11/1968  Slover, Jr. ............... E21B 47/06
                                                         73/152.52
5,927,405 A  *   7/1999  Monjure .................. E21B 33/14
                                                           166/77.2
(Continued)

FOREIGN PATENT DOCUMENTS

| GB | 2350382 A | * 11/2000 | ............ E21B 34/02 |
|---|---|---|---|
| WO | 2006061645 | 6/2006 | |
| WO | 333416 | 6/2013 | |

OTHER PUBLICATIONS

International Search Report and Written Opinion issued in the PCT Application PCT/US2021/032402, dated Sep. 9, 2021 (10 pages).

*Primary Examiner* — Umashankar Venkatesan
(74) *Attorney, Agent, or Firm* — Jeffrey D. Frantz

(57) ABSTRACT

An annulus pressure release system includes a gas metering valve assembly having a fluid pathway. The gas metering valve assembly includes a pressure sensor configured to be fluidly coupled to an annulus and to output a sensor signal indicative of a fluid pressure within the annulus. The gas metering valve assembly also includes an electronically actuated adjustable control valve disposed along the fluid pathway and a electronically actuated two-position valve disposed along the fluid pathway. Furthermore, the gas metering valve assembly includes a flow controller. The flow controller, in response to determining the fluid pressure exceeds a threshold pressure, is configured to output a first control signal to the electronically actuated two-position valve indicative of instructions to open the electronically (Continued)

actuated two-position valve, and to output a second control signal to the electronically actuated adjustable control valve indicative of instructions to adjust a flow of fluid through the fluid pathway.

14 Claims, 10 Drawing Sheets

(51) Int. Cl.
*E21B 34/02* (2006.01)
*G01F 15/18* (2006.01)

(56) References Cited

U.S. PATENT DOCUMENTS

| | | | |
|---|---|---|---|
| 6,513,596 B2 | 2/2003 | Wester | |
| 9,217,322 B2 | 12/2015 | Kleppa | |
| 9,371,713 B2 | 6/2016 | Kleppa | |
| 9,435,190 B2 | 9/2016 | Mulholland et al. | |
| 9,803,463 B2 | 10/2017 | Amundsen et al. | |
| 9,988,866 B2* | 6/2018 | Cotten | G05B 19/05 |
| 10,450,821 B2 | 10/2019 | Guedes et al. | |
| 11,236,571 B2 | 2/2022 | Kleppa | |
| 11,286,734 B2* | 3/2022 | Suter | E21B 47/06 |
| 11,913,300 B1* | 2/2024 | Karakaya | E21B 34/02 |
| 2005/0092523 A1* | 5/2005 | McCaskill | E21B 21/08 |
| | | | 175/218 |
| 2013/0092249 A1 | 4/2013 | Al-Shammari | |
| 2014/0020909 A1 | 1/2014 | McKeon | |
| 2015/0083401 A1* | 3/2015 | Saeed | E21B 34/025 |
| | | | 166/250.01 |
| 2015/0240579 A1* | 8/2015 | Lovorn | E21B 21/08 |
| | | | 166/250.01 |
| 2016/0076322 A1* | 3/2016 | Oddie | E21B 21/08 |
| | | | 73/152.51 |
| 2016/0230484 A1* | 8/2016 | Johnson | E21B 21/08 |
| 2016/0273331 A1* | 9/2016 | Davis | E21B 21/08 |
| 2018/0245466 A1 | 8/2018 | Gosney | |
| 2018/0266198 A1 | 9/2018 | Manum | |
| 2018/0313187 A1 | 11/2018 | Cummins | |
| 2024/0117719 A1* | 4/2024 | Gambaretto | E21B 43/121 |

* cited by examiner

ANNULUS PRESSURE RELEASE SYSTEM

CROSS-REFERENCE TO RELATED APPLICATIONS

This application is the National Stage Entry of International Application No. PCT/US2021/032402, filed May 14, 2021, which claims priority from and the benefit of U.S. Provisional Application Ser. No. 63/024,573, entitled "ANNULUS PRESSURE RELEASE SYSTEM", filed May 14, 2020, and U.S. Provisional Application Ser. No. 63/026,924, entitled "ANNULUS PRESSURE RELEASE SYSTEM", filed May 19, 2020. Each of the above-referenced applications is hereby incorporated by reference in its entirety.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Surface well assemblies generally include an annulus between the production tubing and the casing string configured to receive gas from the well. During normal operation, gas pressure within the annulus supports the production tubing within the casing string. However, if the gas pressure within the annulus exceeds a maximum threshold pressure (e.g., due to leakage through the casing string), the gas may be vented from the annulus (e.g., to a storage tank, to a flare stack, to the atmosphere, or a combination thereof). The gas is generally vented by manually opening multiple valves (e.g., gate valves) that are fluidly coupled to the annulus. Unfortunately, the process of manually opening the valves may be time-consuming and labor intensive.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
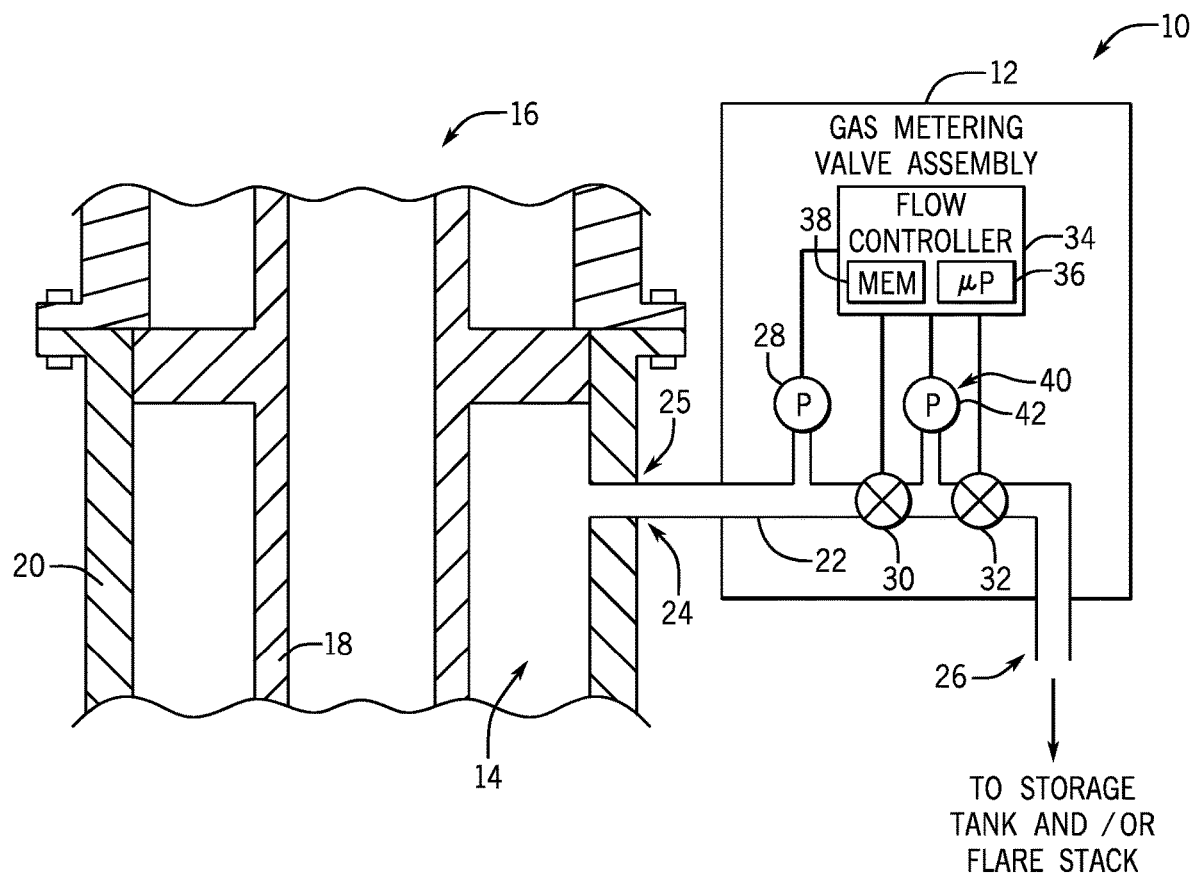
FIG. 1 is a schematic view of an embodiment of an annulus pressure release system having a gas metering valve assembly fluidly coupled to an annulus of a well assembly.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B.

Turning now to the figures, FIG. 1 is a schematic view of an embodiment of an annulus pressure release system 10 having a gas metering valve assembly 12 fluidly coupled to an annulus 14 of a well assembly 16. As illustrated, the well assembly 16 includes production tubing 18 and a casing string 20. The well assembly 16 extends through a well bore from a wellhead to a well. Oil generally flows upwardly through the production tubing 18 to an oil processing facility, and the casing string 20, which extends annularly around the production tubing 18, supports the production tubing 18 within the well bore. As illustrated, the annulus 14 is an annular space formed between the production tubing 18 and the casing string 20. The annulus 14 is configured to receive gas (e.g., natural gas) from the well. In certain embodiments, the annulus may be configured to facilitate a well kill operation, a workover operation, a gas lift operation, other suitable operation(s), or a combination thereof. During normal operation, fluid (e.g., gas) pressure within the annulus 14 supports the production tubing 18 within the casing string 20 (e.g., by reducing the pressure differential between the interior and the exterior of the production tubing).

The gas metering valve assembly 12 is fluidly coupled to the annulus 14 and configured to selectively vent gas from the annulus 14. For example, if the fluid (e.g., gas) pressure within the annulus 14 exceeds a maximum threshold pressure, the gas may be vented from the annulus (e.g., to a storage tank, to a flare stack, to the atmosphere, or a combination thereof). In the illustrated embodiment, the gas metering valve assembly 12 includes a fluid pathway 22 having a first end 24 (e.g., flow inlet) fluidly coupled (e.g., directly fluidly coupled) to the annulus 14 via a fluid connection 25 at the well assembly 16. The fluid pathway 22 also has a second end 26 (e.g., flow outlet) configured to fluidly couple to a storage tank, to a flare stack, to the atmosphere, or a combination thereof. While the second end 26 of the fluid pathway 22 is configured to fluidly couple to a storage compartment/flare stack/atmosphere in the illustrated embodiment, in other embodiments, the second end of the fluid pathway may be configured to fluidly couple to another suitable element (e.g., a processing plant, etc.).

In the illustrated embodiment, the gas metering valve assembly 12 includes a pressure sensor 28 (e.g., first pressure sensor) fluidly coupled (e.g., directly fluidly coupled) to the fluid pathway 22. Accordingly, the pressure sensor 28 is fluidly coupled to the annulus 14 via the fluid connection 25 and the fluid pathway 22. The pressure sensor 28 is configured to output a sensor signal indicative of a fluid pressure within the annulus 14/fluid pathway 22. The pressure sensor 28 may include any suitable type(s) of pressure sensor(s), such as piezoelectric pressure sensor(s), electromagnetic pressure sensor(s), capacitive pressure sensor(s), other suitable type(s) of pressure sensor(s), or a combination thereof.

In addition, the gas metering valve assembly 12 includes an electronically actuated adjustable control valve 30 disposed along the fluid pathway 22. The electronically actuated adjustable control valve 30 is configured to control fluid (e.g., gas) flow through the fluid pathway 22. As used herein, "adjustable control valve" refers to a valve that may be adjusted to multiple positions (e.g., any position) between the open position (e.g., fully open position) and the closed position (e.g., fully closed position), such as a proportional control valve. The electronically actuated adjustable control valve 30 may include any suitable type of adjustable control valve and any suitable type of electronic actuator. For example, the electronically actuated adjustable control valve 30 may include an electromechanical actuator (e.g., electric motor, linear actuator, etc.), an electronically controlled pneumatic actuator (e.g., pneumatic motor, etc.), an electronically controlled hydraulic actuator (e.g., hydraulic motor, etc.), another suitable type of electronic actuator, or a combination thereof. Furthermore, the electronically actuated adjustable control valve 30 may include a gate valve, a needle valve, a ball valve, another suitable type of valve, or a combination thereof.

The gas metering valve assembly 12 also includes an electronically actuated two-position valve 32 disposed along the fluid pathway 22. The electronically actuated two-position valve 32 is configured to selectively block fluid flow through the fluid pathway 22. For example, the electronically actuated two-position valve 32 may block fluid flow through the fluid pathway 22 while the electronically actuated two-position valve 32 is in a closed position, and the electronically actuated two-position valve 32 may enable fluid flow through the electronically actuated two-position valve 32 while the electronically actuated two-position valve 32 is in an open position. The electronically actuated two-position valve 32 may include any suitable type of valve, such as a needle valve, a ball valve, another suitable type of valve, or a combination thereof. In addition, the electronically actuated two-position valve may include any suitable type of electronic actuator. For example, the electronically actuated two-position valve 32 may include an electromechanical actuator (e.g., electric motor, linear actuator, solenoid, etc.), an electronically controlled pneumatic actuator (e.g., pneumatic motor, etc.), an electronically controlled hydraulic actuator (e.g., hydraulic motor, etc.), another suitable type of electronic actuator, or a combination thereof.

In certain embodiments, the electronically actuated two-position valve is a fail-closed valve. In such embodiments, the electronically actuated two-position valve is biased toward the closed position and automatically transitions to the closed position in response to termination of electrical power to the actuator of the electronically actuated two-position valve. However, in other embodiments, the electronically actuated two-position valve may be a fail-open valve or a fail-in-place valve. In the illustrated embodiment, the pressure sensor 28 is positioned upstream of the electronically actuated adjustable control valve 30 and the electronically actuated two-position valve 32. Accordingly, the pressure sensor 28 is configured to output the sensor signal indicative of the fluid pressure within the fluid pathway 22 upstream of the electronically actuated adjustable control valve 30 and the electronically actuated two-position valve 32 (e.g., which corresponds to the fluid pressure within the annulus 14).

In the illustrated embodiment, the gas metering valve assembly 12 includes a flow controller 34 communicatively coupled to the pressure sensor 28, to the electronically actuated adjustable control valve 30, and to the electronically actuated two-position valve 32. In certain embodiments, the flow controller 34 is an electronic controller having electrical circuitry configured to process data from the pressure sensor 28 and to output control signals to the electronically actuated adjustable control valve 30 and to the electronically actuated two-position valve 32. In the illustrated embodiment, the flow controller 34 includes a processor 36, such as a microprocessor, and a memory device 38. The flow controller 34 may also include one or more storage devices and/or other suitable component(s). The processor 36 may be used to execute software, such as software for controlling the electronically actuated adjustable control valve 30 and the electronically actuated two-position valve 32. Moreover, the processor 36 may include multiple microprocessors, one or more "general-purpose" microprocessors, one or more special-purpose microprocessors, and/or one or more application specific integrated circuits (ASICS), or some combination thereof. For example, the processor 36 may include one or more reduced instruction set (RISC) processors.

The memory device 38 may include a volatile memory, such as random access memory (RAM), and/or a nonvolatile memory, such as read-only memory (ROM). The memory device 38 may store a variety of information and may be used for various purposes. For example, the memory device 38 may store processor-executable instructions (e.g., firmware or software) for the processor 36 to execute, such as instructions for controlling the electronically actuated adjustable control valve 30 and the electronically actuated two-position valve 32. The storage device(s) (e.g., nonvolatile storage) may include ROM, flash memory, a hard drive, or any other suitable optical, magnetic, or solid-state storage medium, or a combination thereof. The storage device(s) may store data (e.g., threshold pressure(s), etc.), instructions (e.g., software or firmware for controlling the electronically actuated adjustable control valve 30 and the electronically actuated two-position valve 32, etc.), and any other suitable data.

The flow controller 34 is configured to determine the fluid pressure within the annulus 14/fluid pathway 22 upstream of the electronically actuated adjustable control valve 30 and the electronically actuated two-position valve 32 based on the sensor signal from the pressure sensor 28. The flow controller 34 is also configured to compare the fluid pressure to a maximum threshold pressure. In response to determining that the fluid pressure exceeds the maximum threshold pressure, the flow controller 34 is configured to output a first control signal to the electronically actuated two-position valve 32 indicative of instructions to open the electronically actuated two-position valve. In addition, in response to determining that the fluid pressure exceeds the maximum threshold pressure, the flow controller 34 is configured to output a second control signal to the electronically actuated adjustable control valve 30 indicative of instructions to adjust the flow of fluid through the fluid pathway 22 such that the fluid pressure within the annulus 14/fluid pathway 22 upstream of the electronically actuated adjustable control valve 30 and the electronically actuated two-position valve 32 is less than or equal to the maximum threshold pressure.

By way of example, if the fluid pressure within the annulus 14/fluid pathway upstream of the electronically actuated adjustable control valve 30 and the electronically actuated two-position valve 32 is greater than the maximum threshold pressure (e.g., 1000 psi), the flow controller may instruct the electronically actuated two-position valve to open and control the electronically actuated adjustable control valve such that the fluid pressure is less than or equal to the maximum threshold pressure. For example, the flow controller may control the electronically actuated adjustable control valve such that the fluid pressure is within a threshold range (e.g., 10 percent, 5 percent, 2 percent, 1 percent, etc.) of a target fluid pressure (e.g., 750 psi) to control the pressure differential between the interior and the exterior of the production tubing. Furthermore, if the fluid pressure within the annulus/fluid pathway upstream of the electronically actuated adjustable control valve 30 and the electronically actuated two-position valve 32 is less than a minimum threshold pressure (e.g., 500 psi), the flow controller may instruct the electronically actuated two-position valve and the electronically actuated adjustable control valve to close.

In certain embodiments, the position of the electronically actuated adjustable control valve 30 may be precisely controlled between the open position (e.g., fully open position) and the closed position (e.g., fully closed position), such as via movement of a needle relative to a seat, thereby facilitating precise control of the flow of fluid through the fluid pathway 22. Accordingly, the fluid pressure within the annulus may be precisely controlled (e.g., to substantially achieve the target fluid pressure), thereby enhancing the effectiveness of the gas within the annulus in supporting the production tubing within the casing string (e.g., by reducing the pressure differential between the interior and the exterior of the production tubing) and/or increasing the longevity of the components that form the annulus. Furthermore, because the position of the electronically actuated adjustable control valve 30 may be precisely controlled, the position of the electronically actuated adjustable control valve may be adjusted to vent fluid (e.g., gas) from the annulus at a rate less than the API 14C standard. Accordingly, the electronically actuated adjustable control valve may be considered a barrier even when open (e.g., partially open).

Furthermore, in certain embodiments, the electronically actuated two-position valve is a fail-closed valve. In such embodiments, the flow controller, in response to determining that the fluid pressure is less than the minimum threshold pressure, may terminate output of the first control signal to the electronically actuated two-position valve, such that the electronically actuated two-position valve automatically transitions to the closed position. However, in other embodiments, the flow controller, in response to determining that the fluid pressure is less than the minimum threshold pressure, may output the first control signal to the electronically actuated two-position valve indicative of instructions to close the electronically actuated two-position valve. In addition, in certain embodiments, the flow controller, in response to determining that the fluid pressure is less than the minimum threshold pressure, may output the second control signal to the electronically actuated adjustable control valve indicative of instructions to close the electronically actuated adjustable control valve. Furthermore, in embodiments in which the electronically actuated two-position valve is a fail-closed valve, the electronically actuated two-position valve automatically transitions to the closed position in response to termination of electrical power to the actuator of the electronically actuated two-position valve, regardless of the fluid pressure. While the two valves are closed, two barriers are provided to the release of the gas from the annulus (e.g., the leak rate through the two closed valves may be less than the API 14C standard).

Because the gas metering valve assembly is configured to automatically control the fluid pressure within the annulus, the time associated with controlling the fluid pressure may be significantly reduced (e.g., as compared to controlling the fluid pressure with manually actuated valves). Furthermore, because the gas metering valve assembly is configured to control the fluid pressure within the annulus via a single fluid connection to the annulus, the cost of the annulus pressure release system may be significantly reduced (e.g., as compared to an annulus pressure release system having a pressure sensor fluidly coupled to the annulus at a first fluid connection and a valve assembly fluidly coupled to the annulus at a second fluid connection, remote from the first fluid connection). In addition, in certain embodiments, the gas metering valve assembly may include a gas lift metering valve having the flow controller, the pressure sensor, and the electronically actuated adjustable control valve (e.g., in which the electronically actuated adjustable control valve is configured to fully close). In such embodiments, the electronically actuated two-position valve may be fluidly coupled to the outlet of the gas lift metering valve. Using a gas lift metering valve to facilitate the release of fluid pressure within the annulus may significantly reduce the cost of the annulus pressure release system (e.g., as compared to more complex valve assemblies that are controlled by more complex control systems). For example, the illustrated flow controller may not include a programmable logic controller (PLC), which may reduce the cost of the annulus pressure release system disclosed herein.

While the electronically actuated two-position valve is positioned downstream from the electronically actuated adjustable control valve in the illustrated embodiment, in other embodiments, the electronically actuated two-position valve may be positioned upstream of the electronically actuated adjustable control valve. In such embodiments, the pressure sensor may be fluidly coupled to the fluid pathway between the electronically actuated two-position valve and the electronically actuated adjustable control valve. Accordingly, the pressure sensor may output the sensor signal indicative of the fluid pressure within the annulus/fluid pathway upstream of the electronically actuated adjustable control valve, and the electronically actuated two-position valve may be opened to place the pressure sensor in fluid communication with the annulus before the flow controller determines the fluid pressure.

Furthermore, in certain embodiments, one or more additional valves (e.g., manually controlled gate valve(s), etc.) may be positioned upstream of the gas metering valve assembly, downstream from the gas metering valve assembly, between the electronically actuated adjustable control valve and the electronically actuated two-position valve along the fluid flow path through the fluid pathway, or a combination thereof. One or more additional valves may also be positioned at any suitable location(s) along the fluid pathway within the gas metering valve assembly (e.g., upstream of the pressure sensor, between the pressure sensor and the electronically actuated adjustable control valve, between the electronically actuated adjustable control valve and the electronically actuated two-position valve, downstream from the electronically actuated two-position valve, etc.). In addition, the annulus pressure release systems disclosed herein may be utilized with a surface well assembly or a subsea well assembly.

In the illustrated embodiment, the gas metering valve assembly 12 includes a flow meter 40 communicatively coupled to the flow controller 34. The flow meter 40 is configured to output a sensor signal indicative of a flow rate of the fluid (e.g., gas) through the fluid pathway 22. The flow controller 34 is configured to receive the sensor signal and to determine the flow rate of the fluid (e.g., gas) through the fluid pathway 22. In the illustrated embodiment, the flow meter 40 includes a pressure sensor 42 (e.g., second pressure sensor) fluidly coupled (e.g., directly fluidly coupled) to the fluid pathway 22 downstream from the electronically actuated adjustable control valve 30. The pressure sensor 42 is configured to output a sensor signal indicative of the fluid pressure downstream from the electronically actuated adjustable control valve 30. In addition, the flow controller 34 is configured to determine the flow rate of the fluid (e.g., gas) through the fluid pathway 22 based on the fluid pressure upstream of the electronically actuated adjustable control valve (e.g., as measured by the pressure sensor 28), the position (e.g., between the open and closed positions, inclusive of the open and closed positions) of the electronically actuated adjustable control valve 30 (e.g., as determined based on feedback from a valve position sensor, as determined based on the instructions output to the electronically actuated adjustable control valve, etc.), and the fluid pressure downstream from the electronically actuated adjustable control valve (e.g., as measured by the pressure sensor 42 of the flow meter 40). In embodiments in which the flow controller 34 utilizes feedback from the pressure sensor 28 to determine the flow rate, the pressure sensor 28 may be considered an element of the flow meter 40, and the flow controller 34 may receive two sensor signals from the flow meter 40 (e.g., one sensor signal from each pressure sensor). While the flow meter 40 includes pressure sensor(s) in the illustrated embodiment, in other embodiments, the flow meter may include any other suitable sensor(s) (e.g., alone or in combination with the pressure sensor(s)) configured to facilitate determination of the flow rate of the fluid (e.g., gas) through the fluid pathway. For example, the flow meter may include an optical flow sensor, an ultrasonic flow sensor, another suitable type of flow sensor, or a combination thereof.

In certain embodiments, the flow controller 34 may be configured to identify whether the gas metering valve assembly is leaking fluid (e.g., gas). For example, the flow controller may identify a leak in response to determining that the flow rate of fluid through the fluid pathway 22 is greater than a threshold flow rate (e.g., greater than the API 14C standard) while the electronically actuated adjustable control valve 30 and the electronically actuated two-position valve 32 are closed. In addition, the flow controller 34 may be configured to determine a rate of change of the flow rate while the electronically actuated adjustable control valve 30 and the electronically actuated two-position valve 32 are closed. For example, in response to determining that the flow rate is increasing faster than a threshold flow rate change rate, the flow controller may identify a pre-leak condition (e.g., condition that may result in a future leak), even if the flow rate through the fluid pathway is less than or equal to the threshold flow rate.

Furthermore, in certain embodiments, the gas metering valve assembly 12 may be configured to control the fluid flow rate through the fluid pathway 22 while the electronically actuated adjustable control valve 30 is in an open position (e.g., partially open position or fully open position) and the electronically actuated two-position valve 32 is in the open position. For example, as previously discussed, in response to determining that the fluid pressure exceeds the maximum threshold pressure, the flow controller 34 may output the first control signal to the electronically actuated two-position valve 32 indicative of instructions to open the electronically actuated two-position valve and the second control signal to the electronically actuated adjustable control valve 30 indicative of instructions to at least partially open the electronically actuated adjustable control valve. In certain embodiments, the flow controller 34 may output the second control signal to the electronically actuated adjustable control valve 30 indicative of instructions to adjust the flow of fluid through the fluid pathway 22 such that the flow rate (e.g., as determined based on the sensor signal from the flow meter 40) is within a threshold range (e.g., 10 percent, 5 percent, 2 percent, 1 percent, etc.) of a target flow rate, thereby substantially establishing a target flow rate of the fluid (e.g., gas) through the fluid pathway 22.

In certain embodiments, the gas metering valve assembly 12 may be configured to control injection of fluid (e.g., gas) into the annulus 14. In such embodiments, the flow meter 40 may be configured to output a sensor signal indicative of a flow rate of the fluid (e.g., gas) through the fluid pathway 22 into the annulus 14. To facilitate injection of the fluid into the annulus, the flow controller 34 may output the first control signal to the electronically actuated two-position valve 32 indicative of instructions to open the electronically actuated two-position valve. In addition, while the electronically actuated two-position valve 32 is open, the flow controller 34 may output the second control signal to the electronically actuated adjustable control valve 30 indicative of instructions to adjust the flow of fluid through the fluid pathway 22 such that the flow rate (e.g., as determined based on the sensor signal(s) from the flow meter 40) is within a threshold range (e.g., 10 percent, 5 percent, 2 percent, 1 percent, etc.) of a target flow rate, thereby substantially establishing a target flow rate of the fluid (e.g., gas) through the fluid pathway 22 to the annulus 14. Furthermore, in certain embodiments, the gas metering valve assembly may only be configured to control injection of fluid into the annulus (e.g., as compared to controlling the release of fluid from the annulus). In such embodiments, the pressure sensors of the gas metering valve assembly may be omitted (e.g., in embodiments in which the flow meter does not include pressure sensors). While the gas metering valve assembly includes the flow meter in the illustrated embodiment, in other embodiments, the flow meter may be omitted.

Figure 2:
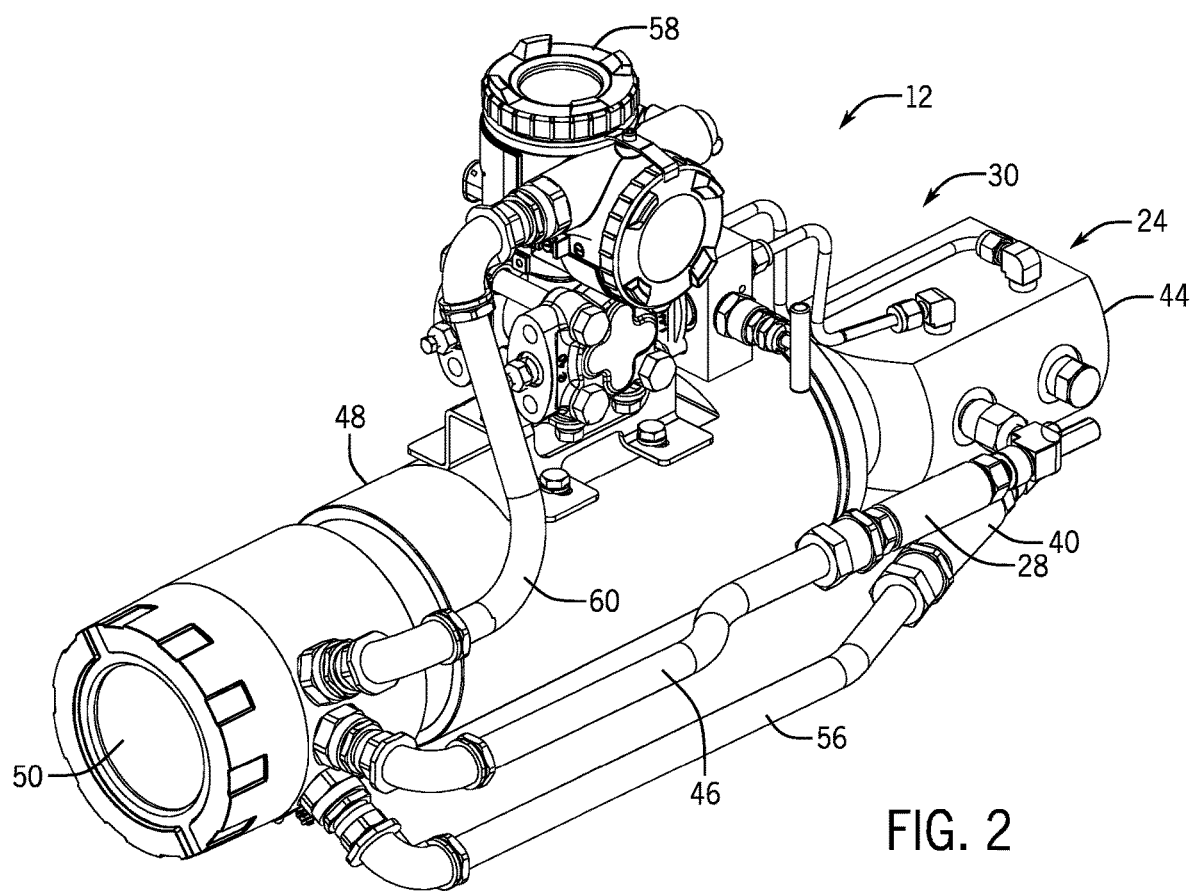
FIG. 2 is a perspective view of an embodiment of a gas metering valve assembly that may be employed within the annulus pressure release system of FIG. 1.
Figure 3:
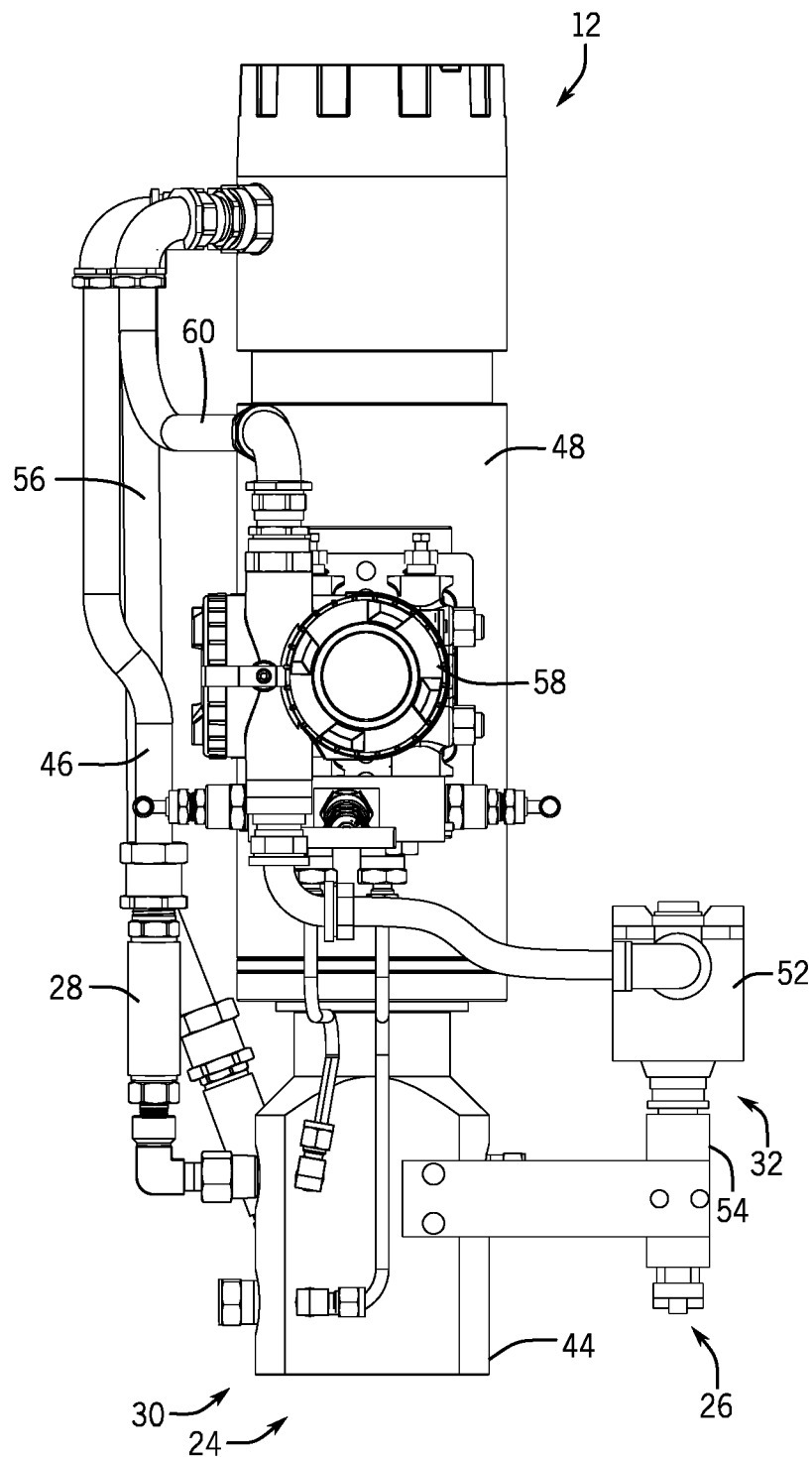
FIG. 3 is a top view of the gas metering valve assembly of FIG. 2.
Figure 4:
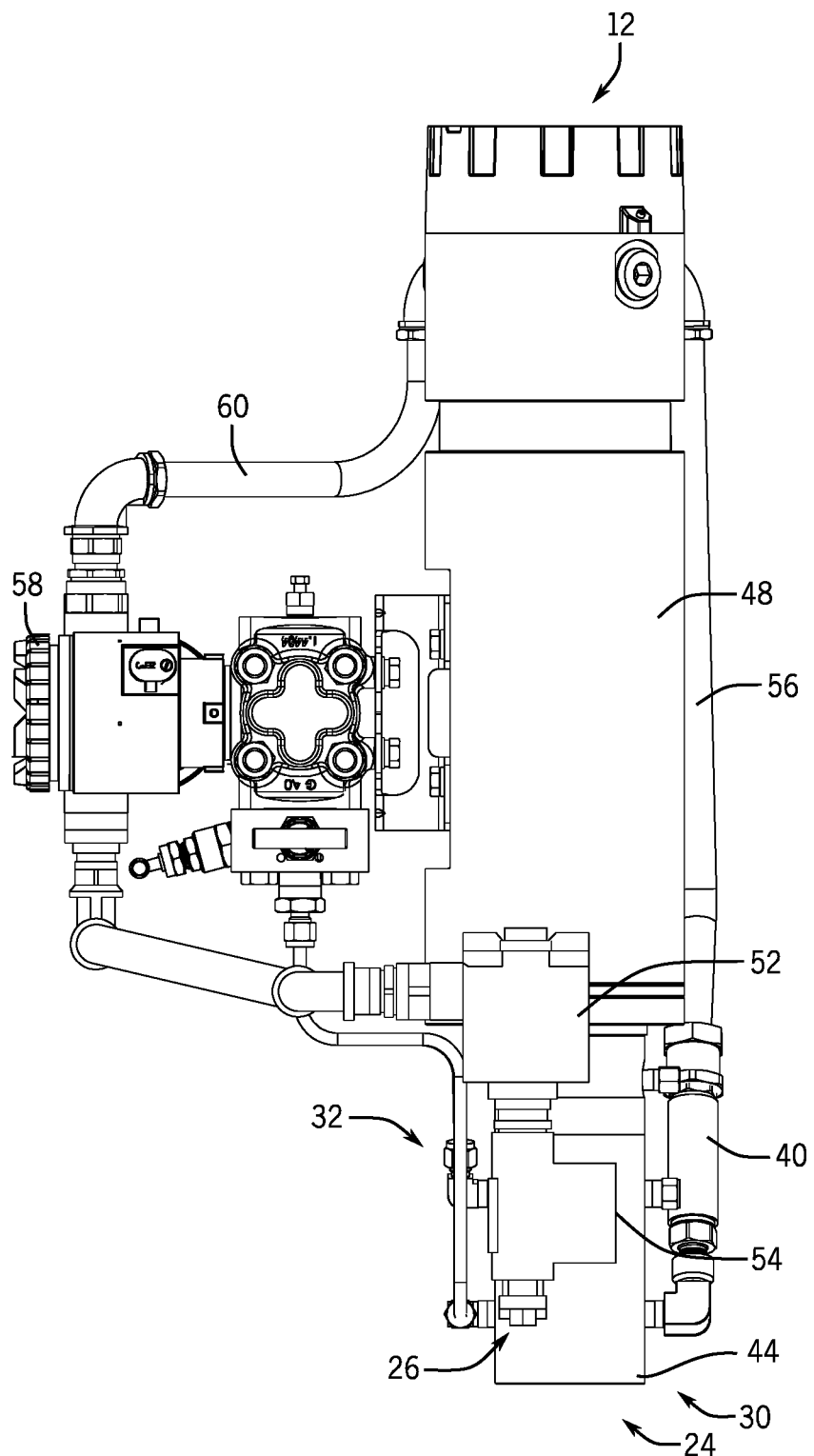
FIG. 4 is a side view of the gas metering valve assembly of FIG. 2.
Figure 5:
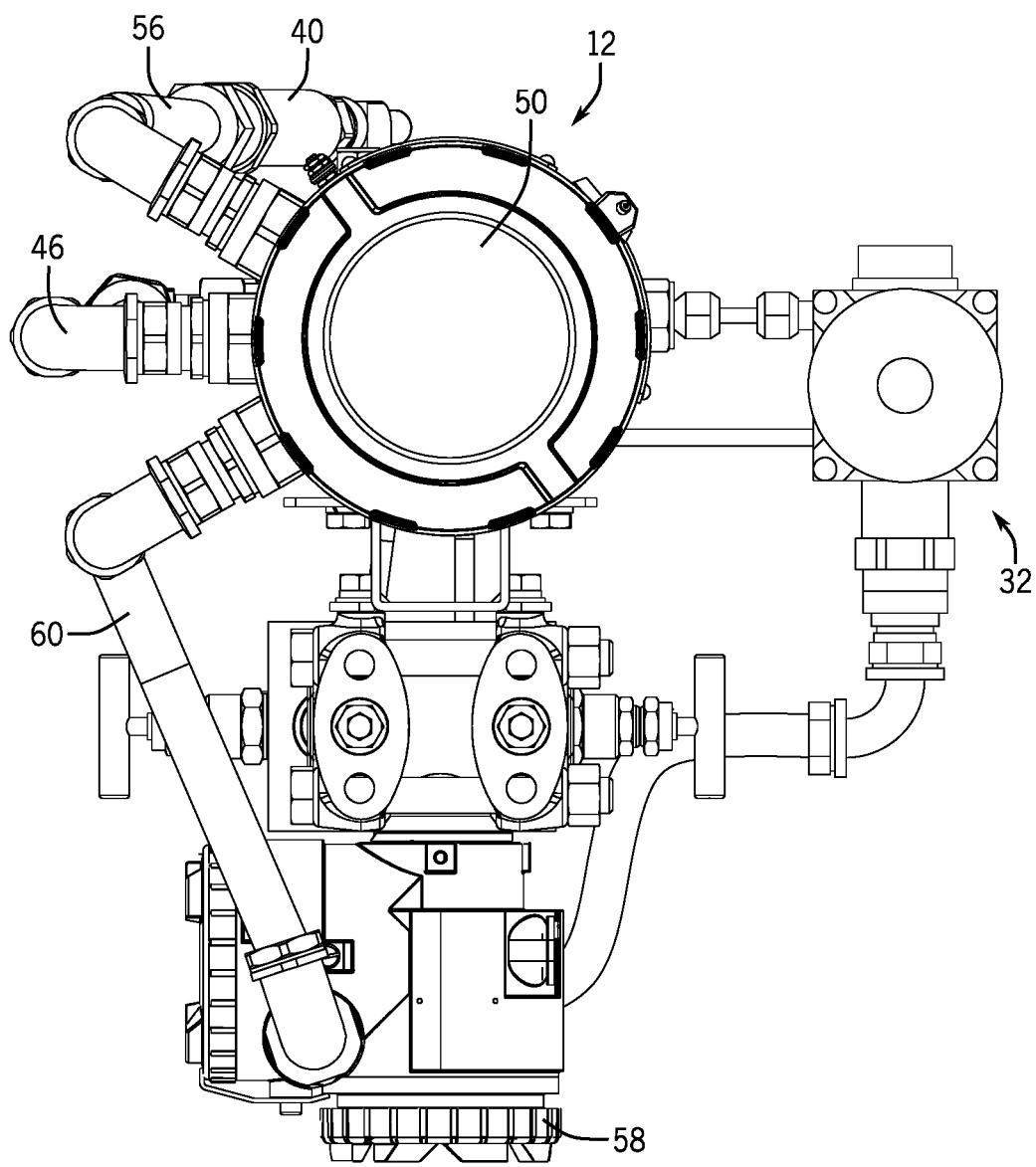
FIG. 5 is a front view of the gas metering valve assembly of FIG. 2.
Figure 6:
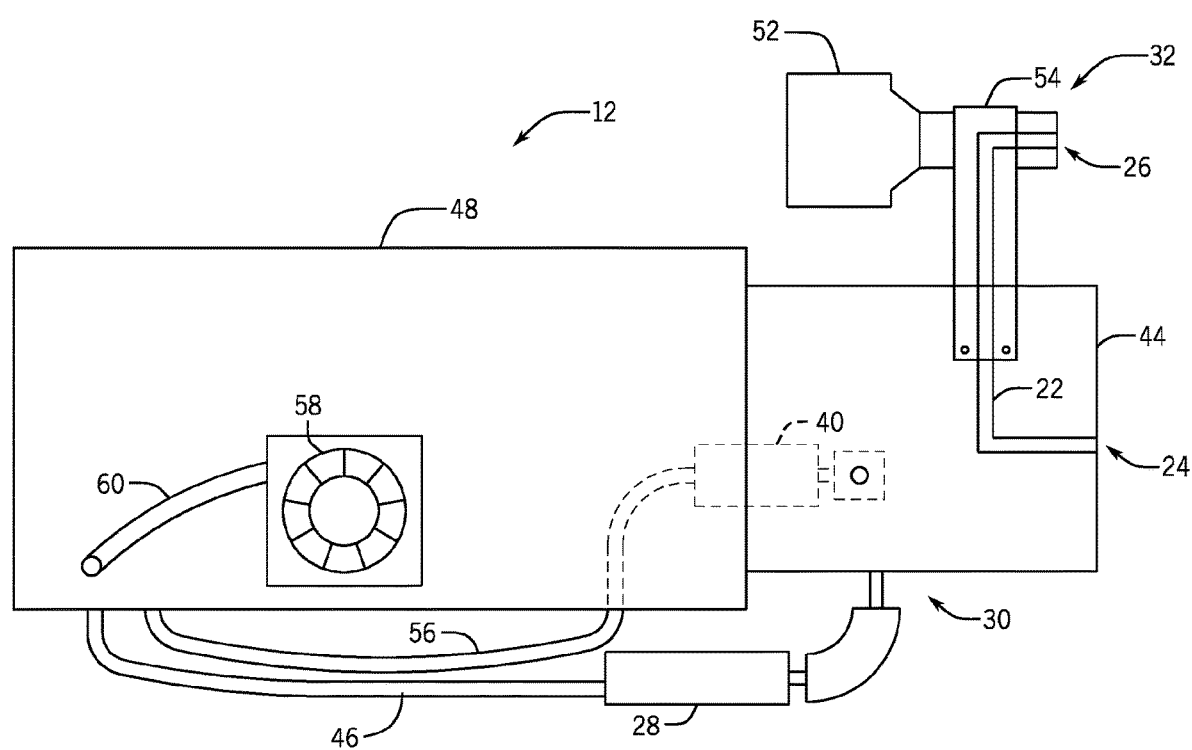
FIG. 6 is a schematic view of the gas metering valve assembly of FIG. 2.

FIG. 2 is a perspective view of an embodiment of a gas metering valve assembly 12 that may be employed within the annulus pressure release system of FIG. 1. FIG. 3 is a top view of the gas metering valve assembly 12 of FIG. 2. FIG. 4 is a side view of the gas metering valve assembly 12 of FIG. 2. FIG. 5 is a front view of the gas metering valve assembly 12 of FIG. 2. FIG. 6 is a schematic view of the gas metering valve assembly 12 of FIG. 2. Referring to FIGS. 2-6, the gas metering valve assembly 12 includes a valve body 44, and a portion of the electronically actuated adjustable control valve 30 is positioned within the valve body 44 and/or formed by the valve body 44. In addition, the fluid pathway 22 extends through the valve body 44 (e.g., the valve body 44 forms a portion of the fluid pathway 22), and the pressure sensor 28 is coupled to the valve body 44 and fluidly coupled to the fluid pathway 22. As previously discussed, the pressure sensor 28 is communicatively coupled to the flow controller. In the illustrated embodiment, the pressure sensor 28 is communicatively coupled to the flow controller by a cable 46. However, in other embodiments, the pressure sensor may be communicatively coupled to the flow controller by any other suitable wired or wireless connection. Furthermore, in the illustrated embodiment, the gas metering valve assembly 12 includes a housing 48 coupled to the valve body 44 and configured to house certain components of the gas metering valve assembly, such as the flow controller and the actuator of the electronically actuated adjustable control valve 30. As illustrated, the cable 46 is coupled to the housing 48.

In the illustrated embodiment, the gas metering valve assembly 12 includes a display 50 (e.g., a liquid crystal display) configured to present information associated with operation of the gas metering valve assembly 12 (e.g., identification of a fluid leak, identification of a pre-leak condition, etc.). The display 50 is positioned within the housing 48 at an end of the housing 48, thereby enabling an operator to view the display. However, in other embodiments, the display may be positioned at any other suitable location within gas metering valve assembly. The display 50 is communicatively coupled to the flow controller, and the flow controller is configured to instruct the display to present information to the operator. In certain embodiments, the display may enable the operator to control the gas metering valve assembly. For example, the display may include a touch screen interface configured to receive input from the operator.

Furthermore, in certain embodiments, the gas metering valve assembly may include a communication interface communicatively coupled to the flow controller. The communication interface may be configured to communicate with a remote system (e.g., terminal, tablet, etc.) via a wired or wireless connection. Accordingly, a remote operator may monitor (e.g., receive an indication of a fluid leak, receive an indication of a pre-leak condition, etc.) and/or control operation of the gas metering valve assembly. For example, in certain embodiments, the flow controller may determine the frequency of annulus gas venting by the gas metering valve assembly. If the frequency is greater than a threshold frequency, the flow controller may inform the operator (e.g., via the display, via the communication interface, etc.) of the frequent venting (e.g., which may indicate that the casing string is leaking more than expected).

The gas metering valve assembly may also include an onboard diagnostic system configured to monitor operation of certain components of the gas metering valve assembly (e.g., sensor(s), valve(s), etc.). The onboard diagnostic system may be communicatively coupled to the flow controller, and the flow controller may provide status information to the operator (e.g., via the display, via the communication interface, etc.) based on feedback from the onboard diagnostic system.

Furthermore, in the illustrated embodiment, the electronically actuated two-position valve 32 is coupled to the valve body 44. However, in other embodiments, the electronically actuated two-position valve may be coupled to the housing or a combination of the housing and the valve body. As illustrated, the electronically actuated two-position valve 32 includes an actuator portion 52 and a valve portion 54. The actuator (e.g., solenoid, etc.) of the actuator portion is configured to drive the valve of the valve portion to selectively open and close to selectively enable and block flow through the fluid pathway.

As previously discussed, in certain embodiments, the gas metering valve assembly 12 includes a flow meter 40. In such embodiments, the flow meter 40 is coupled to the valve body 44 and communicatively coupled to the flow controller. In addition, the flow meter 40 is configured to output a sensor signal indicative of a flow rate of the fluid (e.g., gas) through the fluid pathway 22. The flow controller is configured to receive the sensor signal and to determine the flow rate of the fluid (e.g., gas) through the fluid pathway 22. As previously discussed, the flow meter 40 may include a pressure sensor fluidly coupled to the fluid pathway downstream from the electronically actuated adjustable control valve. The flow controller may determine the flow rate of the fluid (e.g., gas) through the fluid pathway based on the fluid pressure upstream of the electronically actuated adjustable control valve (e.g., as measured by the pressure sensor 28), the position of the electronically actuated adjustable control valve, and the fluid pressure downstream from the electronically actuated adjustable control valve (e.g., as measured by the flow meter 40). In certain embodiments, the flow controller may be configured to identify whether the gas metering valve assembly is leaking fluid (e.g., gas). For example, the flow controller may identify a leak in response to determining that the fluid flow rate through the fluid pathway is greater than a threshold flow rate (e.g., greater than the API 14C standard) while the electronically actuated adjustable control valve and the electronically actuated two-position valve are closed. In the illustrated embodiment, the flow meter 40 is communicatively coupled to the flow controller by a cable 56. However, in other embodiments, the flow meter may be communicatively coupled to the flow controller by any other suitable wired or wireless connection. Furthermore, as illustrated, the cable 56 is coupled to the housing 48. While the gas metering valve assembly includes the flow meter in the illustrated embodiment, in other embodiments, the flow meter may be omitted.

In certain embodiments, the gas metering valve assembly 12 includes a differential pressure sensor 58. In such embodiments, the differential pressure sensor 58 is communicatively coupled to the flow controller and configured to output a sensor signal indicative of a difference between the fluid pressure upstream of the electronically actuated adjustable control valve and the electronically actuated two-position valve and the fluid pressure downstream from the electronically actuated adjustable control valve and the electronically actuated two-position valve. The flow controller, in turn, may receive the sensor signal and determine the pressure differential. In certain embodiments, the differential pressure sensor 58 may provide a more accurate pressure measurement than the pressure sensor 28. In the illustrated embodiment, the differential pressure sensor 58 is communicatively coupled to the flow controller by a cable 60. However, in other embodiments, the differential pressure sensor may be communicatively coupled to the flow controller by any other suitable wired or wireless connection. Furthermore, as illustrated, the cable 60 is coupled to the housing 48. While the gas metering valve assembly includes the differential pressure sensor in the illustrated embodiment, in other embodiments, the differential pressure sensor may be omitted.

Figure 7:
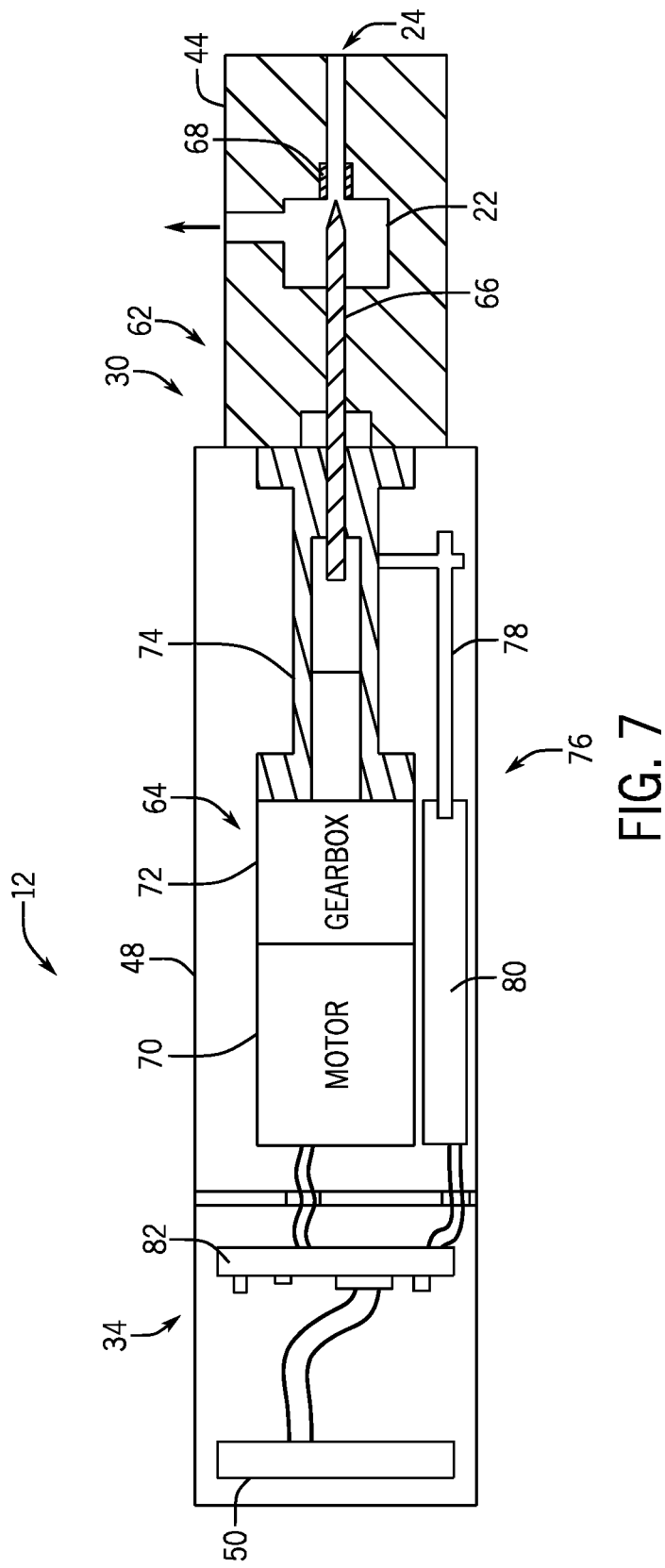
FIG. 7 is a schematic view of a portion of the gas metering valve assembly of FIG. 2.

FIG. 7 is a schematic view of a portion of the gas metering valve assembly 12 of FIG. 2. In the illustrated embodiment, the electronically actuated adjustable control valve 30 includes a needle valve 62 and an electric motor driven actuator 64. The needle valve 62 includes a needle 66 and a seat 68. The needle 66 is moved relative to the seat 68 to control the flow of fluid (e.g., gas) through the fluid pathway 22. While the electronically actuated adjustable control valve 30 includes a needle valve 62 in the illustrated embodiment, in other embodiments, the electronically actuated adjustable control valve may include another suitable type of valve (e.g., gate valve, ball valve, etc.).

Furthermore, the electric motor driven actuator 64 of the electronically actuated adjustable control valve 30 includes an electric motor 70 (e.g., stepper motor), a gearbox 72, and a rotary to linear converter 74. The electric motor 70 is configured to drive an input shaft of the gearbox 72 to rotate, and an output shaft of the gearbox 72 is configured to drive a rotational input of the rotary to linear converter 74 to rotate. The rotary to linear converter, in turn, is configured to drive the needle 66 of the needle valve 62 to move relative to the seat 68, thereby controlling the flow of fluid through the fluid pathway. The rotary to linear converter 74 may include any suitable device(s) configured to convert rotational motion to linear motion, such as a screw drive assembly or a gear and pinion assembly. In certain embodiments, the gearbox may be omitted and/or the electric motor drive actuator 64 may include any other suitable component(s) configured to transmit the rotational energy of the motor to the rotary to linear converter. Furthermore, while the electronically actuated adjustable control valve includes an electric motor driven actuator in the illustrated embodiment, in other embodiments, the electronically actuated adjustable control valve may include any other suitable type of electrical actuator, such as a linear actuator, an electronically controlled pneumatic actuator (e.g., pneumatic motor, etc.), or an electronically controlled hydraulic actuator (e.g., hydraulic motor, etc.).

In the illustrated embodiment, the electronically actuated adjustable control valve 30 includes a valve position sensor 76. The valve position sensor 76 includes a stem 78 rigidly coupled to the needle 66 (e.g., via a portion of the rotary to linear converter 74). The stem 78 is engaged with a linear position sensor 80 (e.g., linear variable differential transformer (LVDT), optical sensor, linear potentiometer, inductive sensor, capacitive sensor, etc.) configured to output a signal indicative of a position of the needle relative to the seat. In embodiments in which the electronically actuated adjustable control valve includes another suitable type of valve (e.g., ball valve, gate valve, etc.), the electronically actuated adjustable control valve may include a suitable position sensor configured to output a signal indicative of the position of the respective valve. Furthermore, in certain embodiments, the valve position sensor may be integrated with the actuator, or the valve position sensor may be omitted.

In the illustrated embodiment, the flow controller 34 includes a control board 82. As illustrated, the control board 82 is communicatively coupled to the display 50, to the linear position sensor 80 of the valve position sensor 76, and to the electric motor 70 of the electric motor driven actuator 64. The control board 82 may include the processor and/or the memory device described above. Accordingly, in certain embodiments, the control board 82 is configured to control the position of the needle valve 62 based on feedback from the linear position sensor 80 by outputting the second control signal to the electric motor 70. Furthermore, the control board 82 may control operation of the display 50.

In certain embodiments, the gas metering valve assembly may include a temperature sensor (e.g., integrated with the first pressure sensor) in fluid communication with the fluid pathway and configured to output a signal indicative of a temperature of the fluid (e.g., gas) within the fluid pathway. In addition, the gas metering valve assembly may include a viscosity sensor (e.g., a rectangular-slit viscometer, etc.) in fluid communication with the fluid pathway and configured to output a signal indicative of a viscosity of the fluid (e.g., gas) within the fluid pathway. While pressure, temperature, and viscosity sensors are disclosed above, in certain embodiments, the gas metering valve assembly may include any other suitable type(s) of sensor(s) (e.g., in fluid communication with the fluid pathway, in optical communication with the fluid pathway, disposed around the fluid pathway, etc.) configured to output signal(s) indicative of the monitored property/properties of the fluid (e.g., gas) within the fluid pathway. Furthermore, the gas metering valve assembly enables Lubricator access to the wellbore. In certain embodiments, the gas metering valve assembly may include a battery (e.g., disposed within the housing) configured to provide electrical power to the flow controller, the electronically actuated adjustable control valve, and the electronically actuated two-position valve (e.g., to facilitate control of the valves in the event that external power is disconnected). Furthermore, in certain embodiments, the gas metering valve assembly may be coupled to an existing well assembly without modification to the well assembly.

Figure 8:
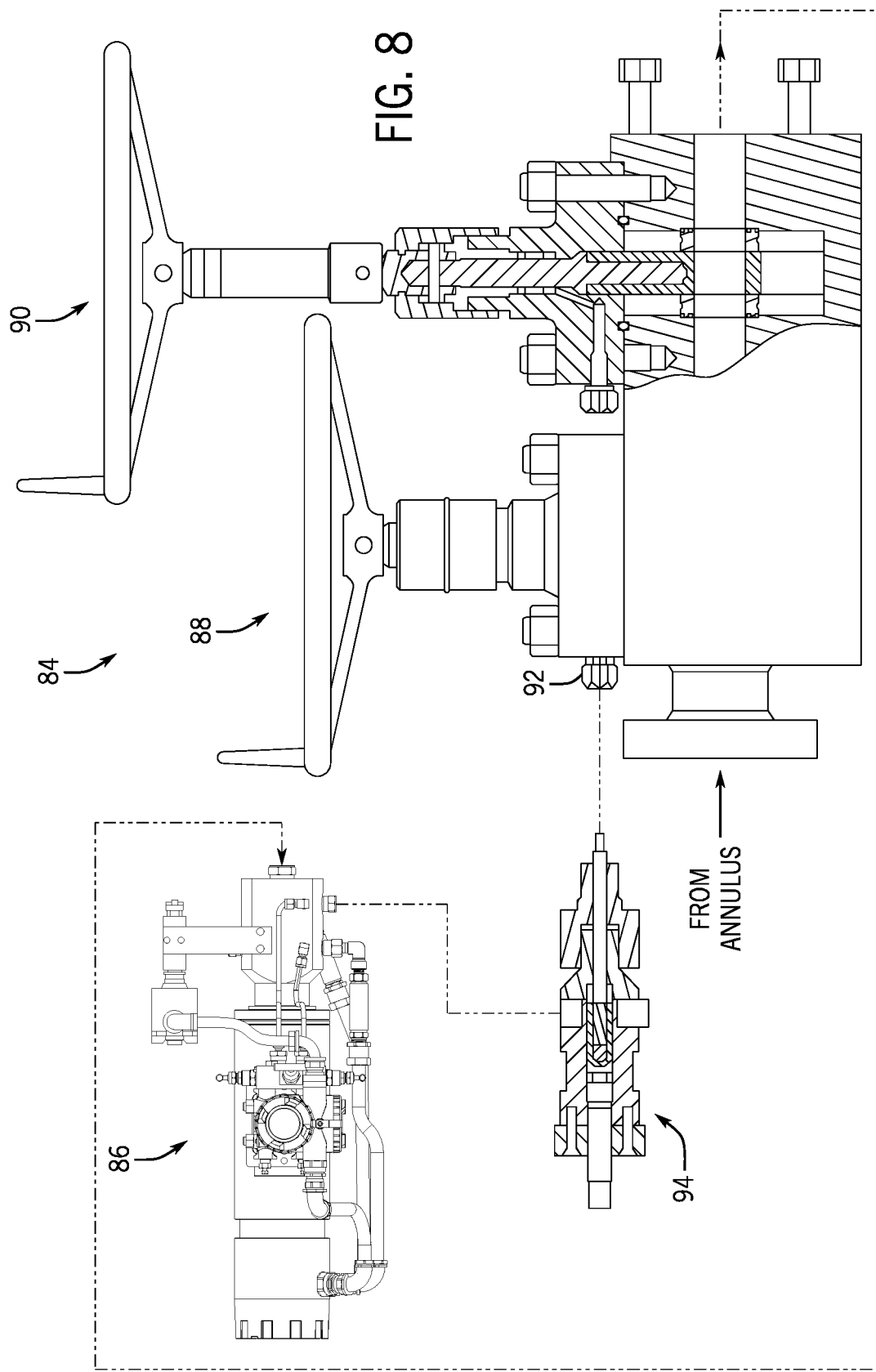
FIG. 8 is a schematic view of another embodiment of an annulus pressure release system.

FIG. 8 is a schematic view of another embodiment of an annulus pressure release system 84. In the illustrated embodiment, the pressure sensor of the gas metering valve assembly 86 is fluidly coupled to a grease port of a valve (e.g., instead of to the fluid pathway of the gas metering valve assembly). For example, a first valve 88 (e.g., manually operated valve) and a second valve 90 (e.g., manually operated valve) are fluidly coupled (e.g., directly fluidly coupled) to the annulus via the fluid connection at the well assembly, and the first and second valves are configured to control the release of fluid pressure from the annulus. As illustrated, the second valve 90 is positioned downstream from the first valve 88. In certain embodiments, the fluid pathway of the gas metering valve assembly 86 may be positioned downstream from the first and second valves. Furthermore, in certain embodiments, the fluid pathway of the gas metering valve assembly 86 may be positioned downstream from the first valve 88 and upstream of the second valve 90. Accordingly, while the first valve 88 is closed, the fluid pathway of the gas metering valve assembly is not in fluid communication with the annulus. As such, in the illustrated embodiment, the pressure sensor is fluidly coupled to the grease port 92 of the first valve 88 (e.g., instead of to the fluid pathway of the gas metering valve assembly). Therefore, the pressure sensor may remain in fluid communication with the annulus via the fluid connection while the first valve 88 is closed.

In the illustrated embodiment, a check valve 94 (e.g., stinger) is fluidly disposed between the grease port and the pressure sensor. However, in other embodiments, the check valve may be omitted. Furthermore, while the pressure sensor is fluidly coupled to the grease port of the first valve in the illustrated embodiment, in other embodiments, the pressure sensor may be fluidly coupled to another suitable portion of the first valve to enable the pressure sensor to remain in fluid communication with the annulus while the first valve is closed. In addition, in embodiments in which the gas metering valve assembly includes a differential pressure sensor, one end of the differential pressure sensor may be fluidly coupled to the grease port of the first valve. All of the features and variations of the gas metering valve assembly disclosed above with reference to FIGS. 1-7 may be included within the illustrated gas metering valve assembly (e.g., except the fluid coupling between the pressure sensor and the fluid pathway of the gas metering valve assembly). Furthermore, the gas metering valve assembly 86 may be configured to control the injection of fluid (e.g., gas) into the annulus (e.g., while the first and second valves are open), as discussed above with reference to FIG. 1. While the illustrated annulus pressure release system includes the first valve 88 and the second valve 90, in other embodiments, the annulus pressure release system may include more or fewer valves. In addition, in the illustrated embodiment, the first and second valves are gate valves. However, in other embodiments, at least one of the valves may be another suitable type of valve (e.g., ball valve, needle valve, etc.).

Figure 9:
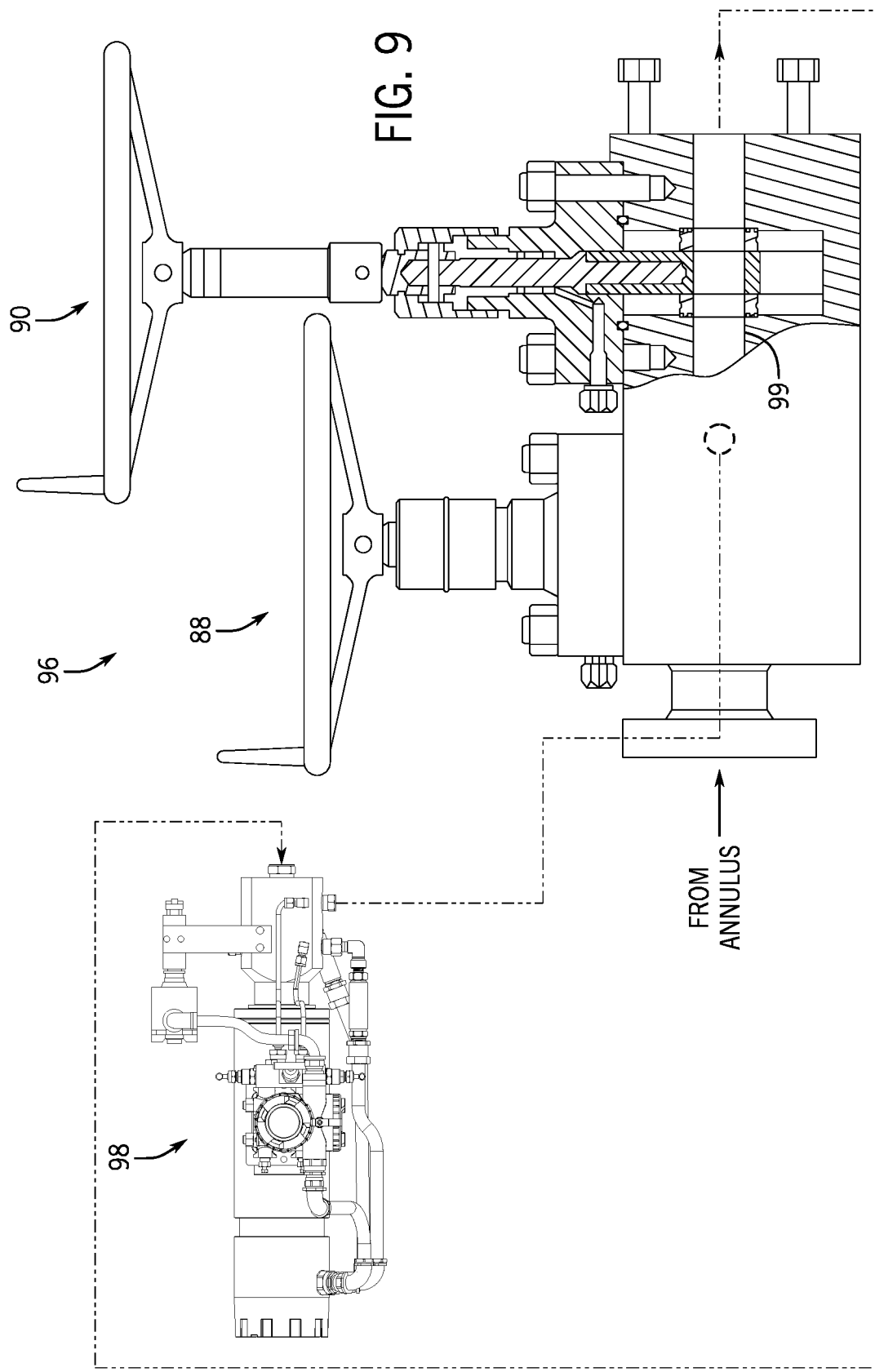
FIG. 9 is a schematic view of a further embodiment of an annulus pressure release system.

FIG. 9 is a schematic view of a further embodiment of an annulus pressure release system 96. In the illustrated embodiment, the pressure sensor of the gas metering valve assembly 98 is fluidly coupled (e.g., directly fluidly coupled) to a fluid passageway 99 between two valves (e.g., instead of to the fluid pathway of the gas metering valve assembly). The first valve 88 and the second valve 90 are fluidly coupled (e.g., directly fluidly coupled) to the annulus via the fluid connection at the well assembly, and the first and second valves are configured to control the release of fluid pressure from the annulus. As illustrated, the second valve 90 is positioned downstream from the first valve 88. In certain embodiments, the fluid pathway of the gas metering valve assembly 98 is positioned downstream from the first and second valves. Accordingly, while the first and second valves are closed, the fluid pathway of the gas metering valve assembly is not in fluid communication with the annulus. As previously discussed, the pressure sensor is fluidly coupled to a fluid passageway between the two valves (e.g., instead of to the fluid pathway of the gas metering valve assembly). Therefore, the pressure sensor may remain in fluid communication with the annulus via the fluid connection while the second valve 90 is closed.

In certain embodiments, a first actuator (e.g., electric motor, etc.) is coupled to the first valve 88, and a second actuator (e.g., electric motor, etc.) is coupled to the second valve 90. In such embodiments, each actuator is communicatively coupled to the flow controller of the gas metering valve assembly 98, thereby enabling the flow controller to instruct each valve to transition between the open position and the closed position. In other embodiments, at least one of the actuators may be omitted, such that the respective valve(s) may be manually controlled. Furthermore, in certain embodiments, at least one actuator may be communicatively coupled to another suitable controller (e.g., which is communicatively coupled to the flow controller of the gas metering valve assembly).

While the pressure sensor is fluidly coupled to the fluid passageway between the two valves in the illustrated embodiment, in other embodiments, the pressure sensor may be fluidly coupled to another suitable portion of the valves to enable the pressure sensor to remain in fluid communication with the annulus while the second valve is closed. In addition, in embodiments in which the gas metering valve assembly includes a differential pressure sensor, one end of the differential pressure sensor may be fluidly coupled to the fluid passageway between the two valves. All of the features and variations of the gas metering valve assembly disclosed above with reference to FIGS. 1-7 may be included within the illustrated gas metering valve assembly (e.g., except the fluid coupling between the pressure sensor and the fluid pathway of the gas metering valve assembly). Furthermore, the gas metering valve assembly 98 may be configured to control the injection of fluid (e.g., gas) into the annulus (e.g., while the first and second valves are open), as discussed above with reference to FIG. 1. While the illustrated annulus pressure release system includes the first valve 88 and the second valve 90, in other embodiments, the annulus pressure release system may include more or fewer valves. In addition, in the illustrated embodiment, the first and second valves are gate valves. However, in other embodiments, at least one of the valves may be another suitable type of valve (e.g., ball valve, needle valve, etc.).

Figure 10:
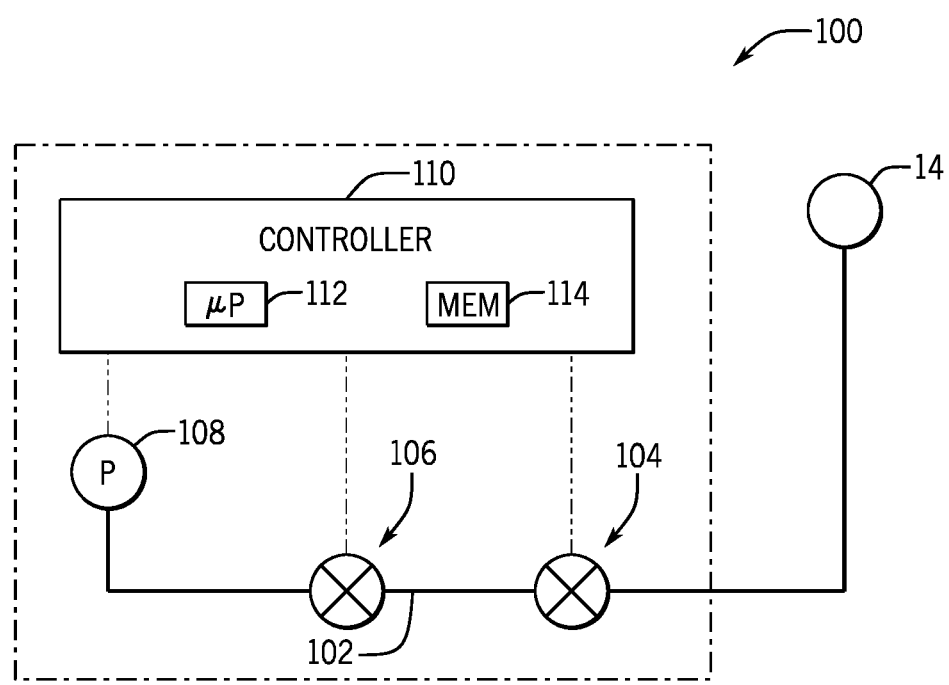
FIG. 10 is a schematic view of an embodiment of a pressure monitoring system coupled to an annulus of a well assembly.

FIG. 10 is a schematic view of an embodiment of a pressure monitoring system 100 coupled to an annulus of a well assembly. In the illustrated embodiment, the pressure monitoring system 100 includes a fluid pathway 102 configured to fluidly couple (e.g., directly fluidly couple) to the annulus 14 of the well assembly (e.g., via the fluid connection at the well assembly). The pressure monitoring system 100 also includes a first electronically actuated two-position valve 104, a second electronically actuated two-position valve 106, and a pressure sensor 108. The pressure sensor 108 is fluidly coupled to the fluid pathway 102, and the first electronically actuated two-position valve 104 and the second electronically actuated two-position valve 106 are disposed along the fluid pathway 102. In addition, the pressure monitoring system 100 includes a controller 110 communicatively coupled to the first electronically actuated two-position valve 104, to the second electronically actuated two-position valve 106, and to the pressure sensor 108. The pressure sensor 108 is configured to output a sensor signal indicative of a fluid pressure within the fluid pathway 102. The pressure sensor 108 may include any suitable type(s) of pressure sensor(s), such as piezoelectric pressure sensor(s), electromagnetic pressure sensor(s), capacitive pressure sensor(s), other suitable type(s) of pressure sensor(s), or a combination thereof.

Each electronically actuated two-position valve is configured to selectively block fluid flow through the fluid pathway 102. For example, each electronically actuated two-position valve may block fluid flow through the fluid pathway 102 while the electronically actuated two-position valve is in the closed position, and each electronically actuated two-position valve may enable fluid flow through the electronically actuated two-position valve while the electronically actuated two-position valve is in the open position. In addition, each electronically actuated two-position valve may include any suitable type of valve, such as a needle valve, a ball valve, another suitable type of valve, or a combination thereof. Furthermore, each electronically actuated two-position valve may include any suitable type of electronic actuator. For example, each electronically actuated two-position valve may include an electromechanical actuator (e.g., electric motor, linear actuator, solenoid, etc.), an electronically controlled pneumatic actuator (e.g., pneumatic motor, etc.), an electronically controlled hydraulic actuator (e.g., hydraulic motor, etc.), another suitable type of electronic actuator, or a combination thereof.

In certain embodiments, each electronically actuated two-position valve is a fail-closed valve. In such embodiments, the electronically actuated two-position valve is biased toward the closed position and automatically transitions to the closed position in response to termination of electrical power to the actuator of the electronically actuated two-position valve. However, in other embodiments, at least one electronically actuated two-position valve may be a fail-open valve or a fail-in-place valve.

In certain embodiments, the controller 110 is an electronic controller having electrical circuitry configured to process data from the pressure sensor 108 and to output control signals to the electronically actuated two-position valves. In the illustrated embodiment, the controller 110 includes a processor 112, such as a microprocessor, and a memory device 114. The controller 110 may also include one or more storage devices and/or other suitable component(s). The processor 112 may be used to execute software, such as software for controlling the electronically actuated two-position valves. Moreover, the processor 112 may include multiple microprocessors, one or more "general-purpose" microprocessors, one or more special-purpose microprocessors, and/or one or more application specific integrated circuits (ASICS), or some combination thereof. For example, the processor 112 may include one or more reduced instruction set (RISC) processors.

The memory device 114 may include a volatile memory, such as random access memory (RAM), and/or a nonvolatile memory, such as read-only memory (ROM). The memory device 114 may store a variety of information and may be used for various purposes. For example, the memory device 114 may store processor-executable instructions (e.g., firmware or software) for the processor 112 to execute, such as instructions for controlling the electronically actuated two-position valves. The storage device(s) (e.g., nonvolatile storage) may include ROM, flash memory, a hard drive, or any other suitable optical, magnetic, or solid-state storage medium, or a combination thereof. The storage device(s) may store data (e.g., threshold pressure(s), etc.), instructions (e.g., software or firmware for controlling the electronically actuated two-position valves, etc.), and any other suitable data.

The controller 110 is configured to determine the fluid pressure within the fluid pathway 102 based on feedback from the pressure sensor 108. For example, the controller 110 may output control signal(s) indicative of instructions to open the electronically actuated two-position valves, thereby establishing a fluid coupling between the pressure sensor 108 and the annulus 14. The controller 110 may then determine the pressure based on the pressure sensor feedback. After the pressure measurement, the controller 110 may output control signal(s) indicative of instructions to close the electronically actuated two-position valves, thereby blocking fluid flow between the annulus and the pressure sensor. While the pressure monitoring system includes two electronically actuated two-position valves in the illustrated embodiment, in other embodiments, the pressure monitoring system may include more or fewer valves of any suitable type (e.g., controlled by the controller). Furthermore, in certain embodiments, the pressure monitoring system may include a temperature sensor in fluid communication with the fluid pathway and positioned downstream from the electronically actuated two-position valves. The temperature sensor is configured to output a signal indicative of a temperature of the fluid (e.g., gas) within the fluid pathway. In addition, the pressure monitoring system may include a viscosity sensor (e.g., a rectangular-slit viscometer, etc.) in fluid communication with the fluid pathway and positioned downstream from the electronically actuated two-position valves. The viscosity sensor is configured to output a signal indicative of a viscosity of the fluid (e.g., gas) within the fluid pathway. While pressure, temperature, and viscosity sensors are disclosed above, in certain embodiments, the pressure monitoring system may include any other suitable type(s) of sensor(s) (e.g., in fluid communication with the fluid pathway and positioned downstream from the electronically actuated two-position valves, in optical communication with the fluid pathway, disposed around the fluid pathway, etc.). Such sensor(s) may be configured to output signal(s) indicative of the monitored property/properties of the fluid (e.g., gas) within the fluid pathway. Furthermore, while the pressure monitoring system includes the pressure sensor in the illustrated embodiment, in other embodiments, the pressure sensor may be omitted and replaced with another suitable type of sensor, such as the temperature sensor and/or the viscosity sensor disclosed above.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An annulus pressure release system, comprising:
a gas metering valve assembly having a fluid pathway configured to fluidly couple to an annulus of a well assembly via a fluid connection at the well assembly, wherein the gas metering valve assembly comprises:
a pressure sensor configured to be fluidly coupled to the annulus via the fluid connection and to output a sensor signal indicative of a fluid pressure within the annulus;
an electronically actuated adjustable control valve disposed along the fluid pathway;
an electronically actuated two-position valve disposed along the fluid pathway; and
a flow controller communicatively coupled to the pressure sensor, to the electronically actuated adjustable control valve, and to the electronically actuated two-position valve, wherein the flow controller, in response to determining the fluid pressure exceeds a maximum threshold pressure, is configured to output a first control signal to the electronically actuated two-position valve indicative of instructions to open the electronically actuated two-position valve, and the flow controller, in response to determining the fluid pressure exceeds the maximum threshold pressure, is configured to output a second control signal to the electronically actuated adjustable control valve indicative of instructions to adjust a flow of fluid through the fluid pathway such that the fluid pressure is less than or equal to the maximum threshold pressure; and a first valve and a second valve configured to fluidly couple to the annulus of the well assembly via the fluid connection at the well assembly, wherein the second valve is positioned downstream from the first valve;

wherein the fluid pathway of the gas metering valve assembly is positioned downstream from the first and second valves or downstream from the first valve and upstream of the second valve, and the pressure sensor is fluidly coupled to a grease port of the first valve.

2. The annulus pressure release system of claim 1, wherein the electronically actuated two-position valve is biased to a closed position, such that the electronically actuated two-position valve automatically transitions to the closed position in response to termination of at least one of the first control signal or electrical power to the electronically actuated two-position valve.

3. The annulus pressure release system of claim 2, wherein the flow controller, in response to determining the fluid pressure is less than a minimum threshold pressure, is configured to terminate output of the first control signal to the electronically actuated two-position valve, such that the electronically actuated two-position valve automatically transitions to the closed position, and the flow controller, in response to determining the fluid pressure is less than the minimum threshold pressure, is configured to output the second control signal to the electronically actuated adjustable control valve indicative of instructions to close the electronically actuated adjustable control valve.

4. The annulus pressure release system of claim 1, wherein the gas metering valve assembly comprises a flow meter communicatively coupled to the flow controller, wherein the flow meter is configured to output a second sensor signal indicative of a flow rate of the flow of fluid through the fluid pathway.

5. The annulus pressure release system of claim 4, wherein the flow controller, in response to determining the fluid pressure exceeds the maximum threshold pressure, is configured to output the second control signal to the electronically actuated adjustable control valve indicative of instructions to adjust the flow of fluid through the fluid pathway such that the flow rate is within a threshold range of a target flow rate.

6. The annulus pressure release system of claim 4, wherein the flow controller is configured to identify a fluid leak in response to determining that the flow rate is greater than a threshold flow rate, the flow controller is configured to identify a pre-leak condition in response to determining that a rate of change of the flow rate is greater than a threshold flow rate change rate, or a combination thereof.

7. The annulus pressure release system of claim 1, wherein the flow controller, in response to determining the fluid pressure exceeds the maximum threshold pressure, is configured to output the second control signal to the electronically actuated adjustable control valve indicative of instructions to adjust the flow of fluid through the fluid pathway such that the fluid pressure is within a threshold range of a target fluid pressure.

8. An annulus pressure release system, comprising:
a gas metering valve assembly having a fluid pathway configured to fluidly couple to an annulus of a well assembly via a fluid connection at the well assembly, wherein the gas metering valve assembly comprises:
a valve body forming a portion of the fluid pathway;
a pressure sensor coupled to the valve body and configured to be fluidly coupled to the annulus via the fluid connection, wherein the pressure sensor is configured to output a sensor signal indicative of a fluid pressure within the annulus;
an electronically actuated adjustable control valve disposed along the fluid pathway, wherein a portion of the electronically actuated adjustable control valve is positioned within the valve body;
an electronically actuated two-position valve disposed along the fluid pathway;
a housing coupled to the valve body, wherein the housing houses an actuator of the electronically actuated adjustable control valve; and
a flow controller disposed within the housing, wherein the flow controller is communicatively coupled to the pressure sensor, to the electronically actuated adjustable control valve, and to the electronically actuated two-position valve;
wherein the flow controller, in response to determining the fluid pressure exceeds a maximum threshold pressure, is configured to output a first control signal to the electronically actuated two-position valve indicative of instructions to open the electronically actuated two-position valve, and the flow controller, in response to determining the fluid pressure exceeds the maximum threshold pressure, is configured to output a second control signal to the electronically actuated adjustable control valve indicative of instructions to adjust a flow of fluid through the fluid pathway such that the fluid pressure is less than or equal to the maximum threshold pressure.

9. The annulus pressure release system of claim 8, wherein the electronically actuated two-position valve is coupled to the valve body.

10. The annulus pressure release system of claim 8, wherein the electronically actuated adjustable control valve comprises a needle valve, and the actuator of the electronically actuated adjustable control valve comprises an electric motor.

11. The annulus pressure release system of claim 8, wherein the gas metering valve assembly comprises a flow meter coupled to the valve body and communicatively coupled to the flow controller, wherein the flow meter is configured to output a second sensor signal indicative of a flow rate of the flow of fluid through the fluid pathway.

12. The annulus pressure release system of claim 8, wherein the electronically actuated two-position valve is biased to a closed position, such that the electronically actuated two-position valve automatically transitions to the closed position in response to termination of at least one of the first control signal or electrical power to the electronically actuated two-position valve.

13. The annulus pressure release system of claim 12, wherein the flow controller, in response to determining the fluid pressure is less than a minimum threshold pressure, is configured to terminate output of the first control signal to the electronically actuated two-position valve, such that the electronically actuated two-position valve automatically transitions to the closed position, and the flow controller, in response to determining the fluid pressure is less than the minimum threshold pressure, is configured to output the second control signal to the electronically actuated adjustable control valve indicative of instructions to close the electronically actuated adjustable control valve.

14. The annulus pressure release system of claim 8, wherein the flow controller, in response to determining the fluid pressure exceeds the maximum threshold pressure, is configured to output the second control signal to the electronically actuated adjustable control valve indicative of instructions to adjust the flow of fluid through the fluid pathway such that the fluid pressure is within a threshold range of a target fluid pressure.

* * * * *